March 5, 1968  K. J. CLEEREMAN ET AL  3,371,387
MOLD WITH MECHANICAL SEALS AT THE PARTING LINE
Filed Oct. 22, 1965  2 Sheets-Sheet 1

Kenneth J. Cleereman
Edward R. Sederlund
INVENTORS

BY
Dominik + Stein
ATTORNEYS

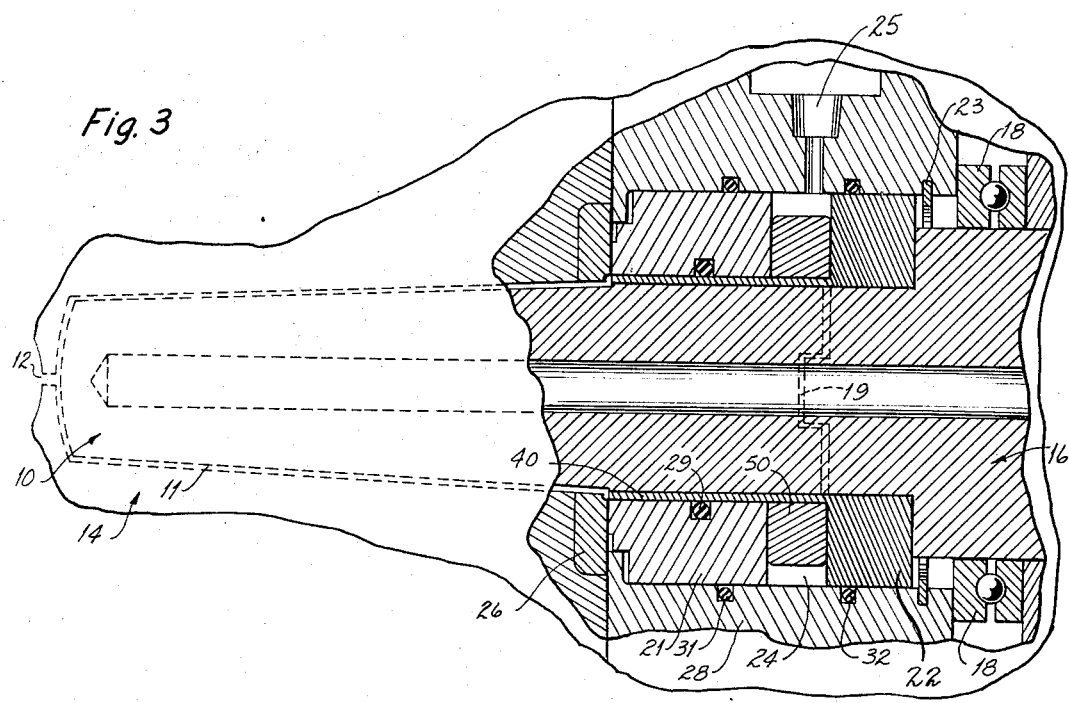

United States Patent Office 3,371,387
Patented Mar. 5, 1968

3,371,387
MOLD WITH MECHANICAL SEALS AT THE PARTING LINE
Kenneth J. Cleereman, Midland, and Edward R. Sederlund, Saginaw, Mich., assignors to The Dow Chemical Company, Midland, Mich., a corporation of Delaware
Filed Oct. 22, 1965, Ser. No. 501,713
17 Claims. (Cl. 18—42)

This invention relates to mechanical seals and more particularly to mechanical seals for molding apparatus wherein at least one mold element is rotated or oscillated during the molding operation to impart orientation to the molecules.

In ordinary injection molding processes, a molten plastic is introduced into the cavity at high pressures and speeds. Usually moving elements of the mold are stationary during injection so that all seals are static seals. The mold is generally held shut by the use of a clamping force on the mold which is higher than the force exerted by the plastic during the injecting cycle. Elements such as knockout pins which move only when the plastic is solidified are no problem to seal. In such case, a precision fit with a minimum sliding tolerance will stop polymer flow and no flash is encountered.

An entirely different situation exists, however, when one of the mold elements is rotated or oscillated such as in the very recent development wherein orientation is imparted to the molecules. The normal minimum tolerances, which permit rotation or oscillation cause flow of the plastic into the seal. This appears to be caused by a reduction in viscosity of the polymer.

Journal bearings are not generally satisfactory because the molten plastic flashes into the bearing seal. The bearing must then be cleaned out between each cycle. In a production operation, this would be intolerable.

It is an object of the present invention to provide an improved seal for molding plastic wherein rotation or oscillation of one of the mold elements is used.

It is another object to provide a fairly simple seal for such molding.

It is still another object to provide mechanical seals in apparatus of the above described type which will hold molten plastic, hence eliminating flashing.

It is still another object to provide mechanical seals which have a relatively long life.

It is still another object to provide mechanical seals which can be easily cleaned.

It is still another object to provide mechanical seals which need not be continuously lubricated.

It is still another object to provide mechanical seals which are constructed in a fashion such that centering of a rotating mandrel is more easily accomplished and which, in addition, function as a stripper ring to remove the molded article from the mandrel.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

A seal structure has now been devised which accomplishes the above objectives by relocating most of those parts which move relative to one another to a position in the mold apparatus removed from the molten plastic and the parts that move are mechanically sealed under pressure whereby a substantially zero tolerance exists. More specifically, the seal structure comprises, in its broadest sense, mechanical joint elements which are held together under pressure so a substantially zero tolerance exists at their interface. This face comprises the only seal between the moving and the stationary elements of the rotating or oscillating mold apparatus which comes into contact with the plastic being molded. Because the seal is held under pressure, little, if any, flashing occurs. The face is also positioned at the parting line of the mold whereby inspection and cleaning is easily possible.

For a fuller understanding of the nature and objects of the invention, reference should be had to the following detailed description taken in connection with the accompanying drawing, in which:

FIG. 3 is a partial view of injection molding apparatus which is broken away and sectioned to illustrate a mechanical seal constructed in still another fashion.

Similar reference characters refer to similar parts throughout the several views of the drawing.

Figure 1:
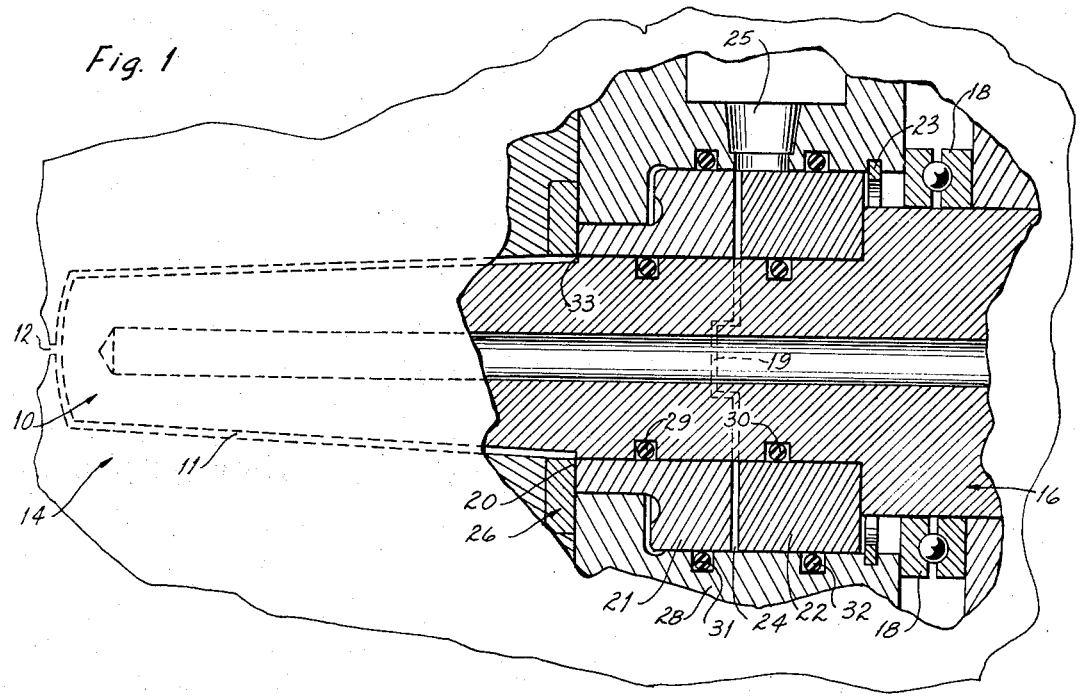
FIG. 1 is a partial broken view of injection molding apparatus illustrating a mechanical seal constructed in accordance with a first embodiment of the invention.
Figure 2:
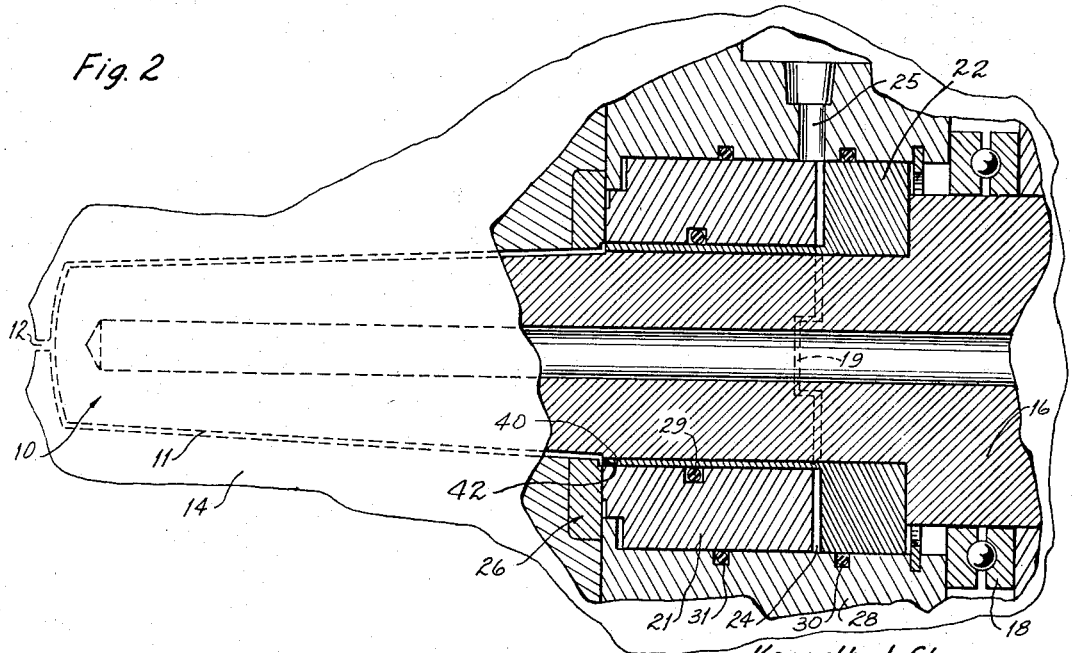
FIG. 2 is a partial, broken view of injection molding apparatus illustrating a mechanical seal constructed in accordance with a second embodiment of the invention.

Referring now to the drawings, FIGS. 1 to 3 illustrate various mechanical seal structures, incorporated into injection molding apparatus. With the exception of variations in the mechanical seal design described in detail below, the injection molding apparatus may be of the type generally well known in the industry and, for this reason, only that portion thereof which is necessary to explain the invention is illustrated. Also, while the description presumes that the mandrel 10 is rotated, it could as well be oscillated, or rotated and oscillated.

As in known, injection mold apparatus generally has a nozzle valve and an injection plunger, both of which individually reciprocate within an injection cylinder to supply a metered amount of fluid thermoplastic material to a mold cavity 11 defined by an outer mold element 14 and an inner mating mold element or mandrel 10.

The fluid thermoplastic is injected through orifice 12, into the mold cavity 11. Fluid plastic conveying means, such as an extruder, is generally provided to supply fluid plastic to the injection cylinder in a continuous fashion. Usually, for simplicity the outer mold element is stationary and the inner mold element is rotated. This may, however, be reversed, if desired.

Mandrel 10 comprises the forward end of a spindle 16 which is rotatably secured within a thrust bearing 18 and which has a presettable constant torque motor (not shown) drivingly coupled to its one end.

One embodiment of mechanical seal design is shown in FIG. 1. It consists of a cylindrical rotating seal member made up of rotating ring members 21 and 22, which are forced apart by means of fluid pressure, injected through an annular pressure gap 24 via inlet 25. Ring members 21 and 22 are keyed to each other and to mandrel 10.

Rotating ring 21 abuts against the stationary seal ring 26 located in the outer mold element to form a seal face 20. Thus as pressure is increased in the gap 24, a lesser clearance is attained between rings 21 and 26.

The rotating seal is retained within a flange 28 via lock ring 23. In this embodiment, seal ring 21 also acts as a stripper means to remove the molded article from the mandrel 10, when the apparatus is opened.

O-rings 29–32 act to seal the fluid pressure adjacent gap 24.

As is evident this design has only one seal face at the parting line of the mold, so that when exposed it can be easily inspected and cleaned if the seal fails and flashes. Also any flash that occurs will be attached to the molded article. It will therefore be removed when the article is removed.

In constructing the seal, the stationary seal ring 26 is preferably shrunk into the outer mold element 14, with a 1° reverse taper. The ring 26 is preferably made of a hard grade material such as, tungsten carbide. A tungsten carbide which is satisfactory is General Electric Carbine Type 883 made by General Electric Co., Schenectady, N.Y. or Kennametal Carbide Type K 96 made by Kennecott Copper Co., New York, N.Y.

Rotary seal rings 21 and 22 are preferably made of a softer grade material such as bronze or a softer grade carbide or hardened Meehanite. Kennametal Carbide K 82, or G A Meehanite hardened to $R_c$ 45 to 50 made by General Foundry and Manufacturing Company, Flint, Michigan are specific examples of suitable material.

With such design, a seal face pressure of approximately 1200 p.s.i. will prevent flash while the torque required to overcome losses in the drive mechanism, friction due to the O-rings 29–32 and the seal face friction, is only approximately 2000 inch lbs.

It might be specifically noted that the rotating seal ring 21 overhangs the mold cavity to a slight extent at 33. Since the injection pressure must therefore act aganst a small area of the seal ring 21 during each cycle, the fluid pressure within gap 24 must be somewhat higher.

Furthermore, when the molded article is stripped from the mandrel 10 by forward movement of seal ring 21, an insufficient overhang may cause shearing of the lip of the molded article especially molding softer polymers such as polypropylene. Therefore, an undesirable wide overhang may be necessary.

In FIG. 2 there is illustrated the preferred mechanical seal structure in which the stripper means is separated from the seal, to eliminate the above described problems. Also, since the injected thermoplastic does not act against a portion of the seal ring 21, as in FIG. 1, lower fluid pressure may be used to provide a good seal joint.

The elements of the seal structure of FIG. 2 are essentially the same as the seal structure of FIG. 1, and have been so designated by the use of similar part numbers. The difference is that ring member 22 has as an integral part thereof a cylindrical extension stripper means 40 between mandrel 10 and seal ring 21. This enables removal of the molded article by the simple expedient of moving said article forward (to the left in the drawing) after the mold is opened.

To provide for such cylindrical extension stripper means, the inside diameter of seal ring 21 is increased to coincide approximately with the outside diameter of the outer element of the mold cavity. The said extension stripper means 40 provides the backup to form the lip 42 of the molded article so that the injected thermoplastic acts upon it instead of the rotary seal ring 21.

As shown rotary seal rings 21 and 22 having the cylindrical extension stripper means 40 as a part thereof, and mandrel 10 rotate as a single member. Thus, the joints between these elements, relative to each other remain stationary. It is therefore not difficult to prevent flash because tolerances may be kept to a minimum since rotary movement between the elements is not involved.

FIG. 3 illustrates a third embodiment of seal. It uses a compression element 50, which may be a Belleville spring or a rubber compression ring or a series of springs about the periphery of the seal rings or other pressure exerting means in place of or in addition to the fluid pressure of the seal structures of FIGS. 1 and 2. This compression element 50 provides for elimination or use of a reduced fluid pressure. For production purposes, it is preferred that only a compression element of proper force be used.

In the use of the seal structure of this invention, molten or liquid thermoplastic hardens during each cycle at the seal face 20 and occasionally causes some powdery deposit there. If removed, this deposit does not cause any problem, however, if left, the seal may be upet and flash or damage to the seal occurs. While many cycles can be run successfully without cleaning, such contamination must eventually be removed. Such removal is facilitated by the fact that the seal is at the parting line of the mold.

A very light oil film is also preferably put on the seal faces, to reduce friction between them. The life of the seal is therefore increased.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A mechanical seal for use in molding apparatus having an outer mold element and an inner mating mold element which together define a mold cavity and one of which is rotated or oscillated during the molding cycle, said mechanical seal comprising a first sealing ring fixedly secured to said outer mold element and exposed at the parting line of said molding apparatus; a seal member including a second sealing ring about said inner mold element with said second sealing ring engageable with said first sealing ring when said molding apparatus is closed; and means for forcing said second sealing ring into engagement with said first sealing ring when said molding apparatus is closed.

2. A mechanical seal for use in molding apparatus having an outer mold element and an inner mating mold element which together define a mold cavity and one of which is rotated or oscillated during the molding cycle, said mechanical seal comprising a first sealing ring fixedly secured to said outer mold element and exposed at the parting line of said molding apparatus; a seal member including a second and a third sealing ring about said inner mold element with said second sealing ring engageable with said first sealing ring when said molding apparatus is closed, a portion of the surface of said second sealing ring which is engageable with said first sealing ring overhanging said first sealing ring and forming a stripper means for removing molded objects from said inner mold element when the molding apparatus is opened; and means for forcing said second sealing ring into engagement with said first sealing ring when said molding apparatus is closed.

3. A mechanical seal, as claimed in claim 2, wherein said first sealing ring is fabricated of a hard grade material and wherein said second and third sealing rings are fabricated of a softer grade material in comparison.

4. A mechanical seal, as claimed in claim 2, wherein said means for forcing said second sealing ring into engagement with said first sealing ring comprises fluid pressure which is injected between said second and third sealing rings.

5. A mechanical seal, as claimed in claim 2, wherein said means for forcing said second sealing ring into engagement with said first sealing ring comprises a resilient means forcibly urged between said second and third sealing rings.

6. A mechanical seal, as claimed in claim 2, wherein said resilient means comprises a rubber compression ring.

7. A mechanical seal, as claimed in claim 2, wherein said resilient means comprises a Belleville spring.

8. A mechanical seal, as claimed in claim 2, wherein said resilient means comprises a series of springs about the periphery of the sealing rings.

9. A mechanical seal for use in injection molding apparatus having an outer mold element and an inner mating mold element which together define a mold cavity and one of which is rotated or oscillated during the molding cycle, said mechanical seal comprising a first sealing ring fixedly secured to said outer mold element and exposed at the parting line of said molding apparatus; a seal member including a second and a third sealing ring, said third sealing ring having a cylindrical extension thereof about said inner mold element and having the edge of said extension exposed at the parting line of said mold, said exposed edge forming a part of said mold cavity and functioning to strip molded objects from said inner mold element, said second sealing ring extending about said cylindrical extension of said third sealing ring and engageable with said first sealing ring when said molding apparatus is closed; and means for forcing said second sealing ring into engagement with said first sealing ring when said molding apparatus is closed.

10. A mechanical seal, as claimed in claim 9, wherein said means for forcing said second sealing ring into engagement with said first sealing ring comprises fluid pressure which is injected between said second and third sealing rings.

11. A mechanical seal, as claimed in claim 9, wherein said means for forcing said second sealing ring into engagement with said first sealing ring comprises a resilient means forcibly urged between said second and third sealing rings.

12. A mechanical seal, as claimed in claim 9, when said first sealing ring is fabricated of a hard grade material and wherein said second and third sealing rings are fabricated of a softer grade material in comparison.

13. A mechanical seal for use in injection molding apparatus having an outer mold element and an inner mating mold element which together define a mold cavity, said inner mating mold element being adapted to be rotated or oscillated during the molding cycle, said mechanical seal comprising a first stationary sealing ring fixedly secured to said outer mold element and exposed at the parting line of said molding apparatus; a rotatable seal member including a second and a third sealing ring about said inner mold element with said second sealing ring engageable with said first sealing ring when said molding apparatus is closed; and means for forcing said second sealing ring into engagement with said first sealing ring when said molding apparatus is closed.

14. A mechanical seal for use in injection molding apparatus having an outer mold element and an inner mating mold element which together define a mold cavity, said inner mold element being adapted to be rotated or oscillated during the molding cycle, said mechanical seal comprising a first stationary sealing ring fixedly secured to said outer mold element and exposed at the parting line of said molding apparatus; a rotatable seal member including a second and a third sealing ring about said mandrel with said second sealing ring engageable with said first sealing ring when said molding apparatus is closed a portion of the surface of said second sealing ring which is engageable with said first sealing ring overhanging said first sealing ring and forming a stripper ring for removing molded objects from said inner mold element when said molding apparatus is opened; and means for forcing said second sealing ring into engagement with said first sealing ring when said molding apparatus is closed.

15. A mechanical seal for use in injection molding apparatus having an outer mold element and an inner mating mold element which together define a mold cavity, said inner mold element being adapted to be rotated or oscillated during the molding cycle, said mechanical seal comprising a first stationary sealing ring fixedly secured to said outer mold element and exposed at the parting line of said molding apparatus; a seal member including a second and a third sealing ring, said third sealing ring having a cylindrical extension thereof about said inner mold element and having the edge of said extension exposed at the parting line of said mold, said exposed edge forming a part of said mold cavity and functioning to strip molded objects from said inner mold element, said second sealing ring extending about said cylindrical extension of said third sealing ring and engageable with said first sealing ring when said molding apparatus is closed; and means for forcing said second sealing ring into engagement with said first sealing ring when said molding apparatus is closed.

16. A mechanical seal for use in injection molding apparatus having an outer mold element and an inner mating mold element which together define a mold cavity, said inner mold element being adapted to be rotated or oscillated during the molding cycle, said mechanical seal comprising a first stationary sealing ring shrunk into said outer mold element and exposed at the parting line of said molding apparatus; a rotatable seal member including a second and a third sealing ring about said mandrel with said second sealing ring engageable with said first sealing ring when said molding apparatus is closed, a portion of the surface of said second sealing ring which is engageable with said first sealing ring overhanging said first sealing ring and forming a stripper ring for removing molded objects from said inner mold element when the molding apparatus is opened; fluid pressure means for forcing a fluid between said second and third sealing rings to urge said second sealing ring into engagement with said first sealing ring when said molding apparatus is closed; O-rings about said second and third sealing rings and about said inner mold element for retaining said fluid.

17. A mechanical seal for use in injection molding apparatus having an outer mold element and an inner mating mold element which together define a mold cavity, said inner mold element being adapted to be rotated or oscillated during the molding cycle, said mechanical seal comprising a first stationary sealing ring fixedly secured to said outer mold element and exposed at the parting line of said molding apparatus; a seal member including a second and a third sealing ring, said third sealing ring having a cylindrical extension thereof about said inner mold element and having the edge of said extension exposed at the parting line of said mold, said exposed edge forming a part of said mold cavity and functioning to strip molded objects from said inner mold element, said second sealing ring extending about said cylindrical extension of said third sealing ring and engageable with said first sealing ring when said molding apparatus is closed, and resilient means compressed between said first and second sealing rings for forcing said second sealing ring into engagement with said first sealing ring when said molding apparatus is closed.

References Cited
UNITED STATES PATENTS

| | | | |
|---|---|---|---|
| 2,658,237 | 11/1953 | Cuppett et al. | 18—42 |
| 3,030,668 | 4/1962 | Taylor | 18—5 |
| 3,200,175 | 8/1965 | Harrison | 18—5 |
| 3,202,734 | 8/1965 | Young | 18—5 |

WILBUR L. McBAY, *Primary Examiner.*